Figure 1:
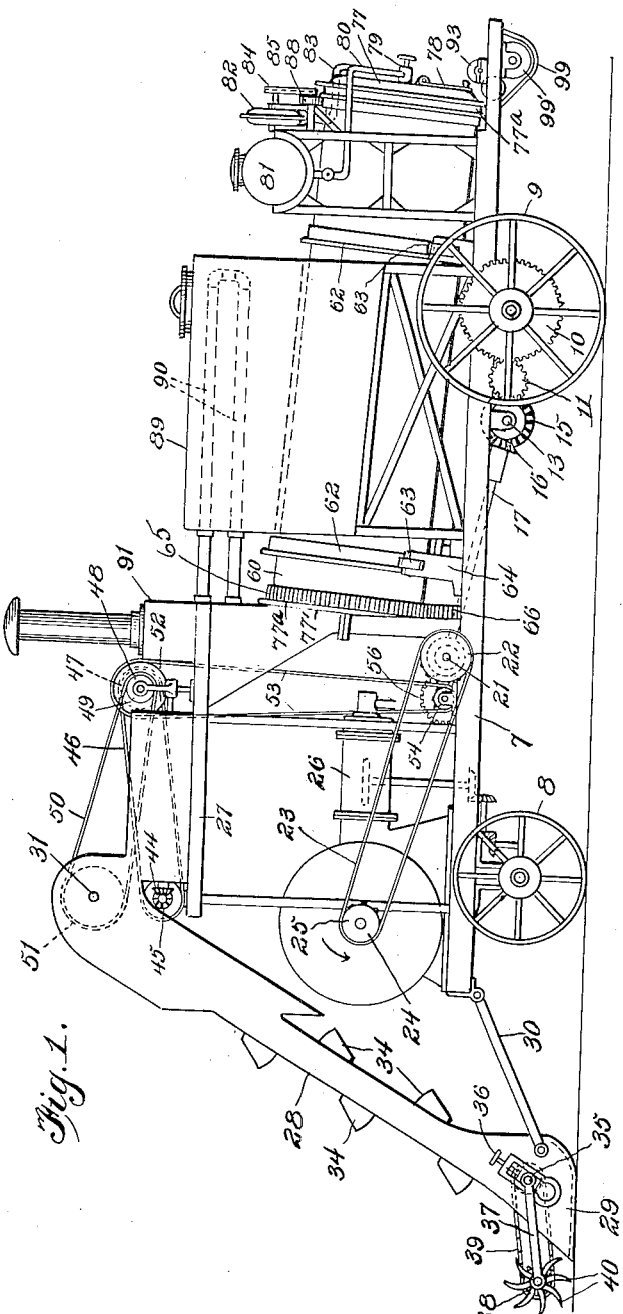

J. W. T. STEPHENS.
ROAD MAKING MACHINE.
APPLICATION FILED APR. 21, 1919.

1,354,076.

Patented Sept. 28, 1920.
4 SHEETS—SHEET 1.

Inventor
J. W. T. Stephens
By C. C. Hines,
Attorney

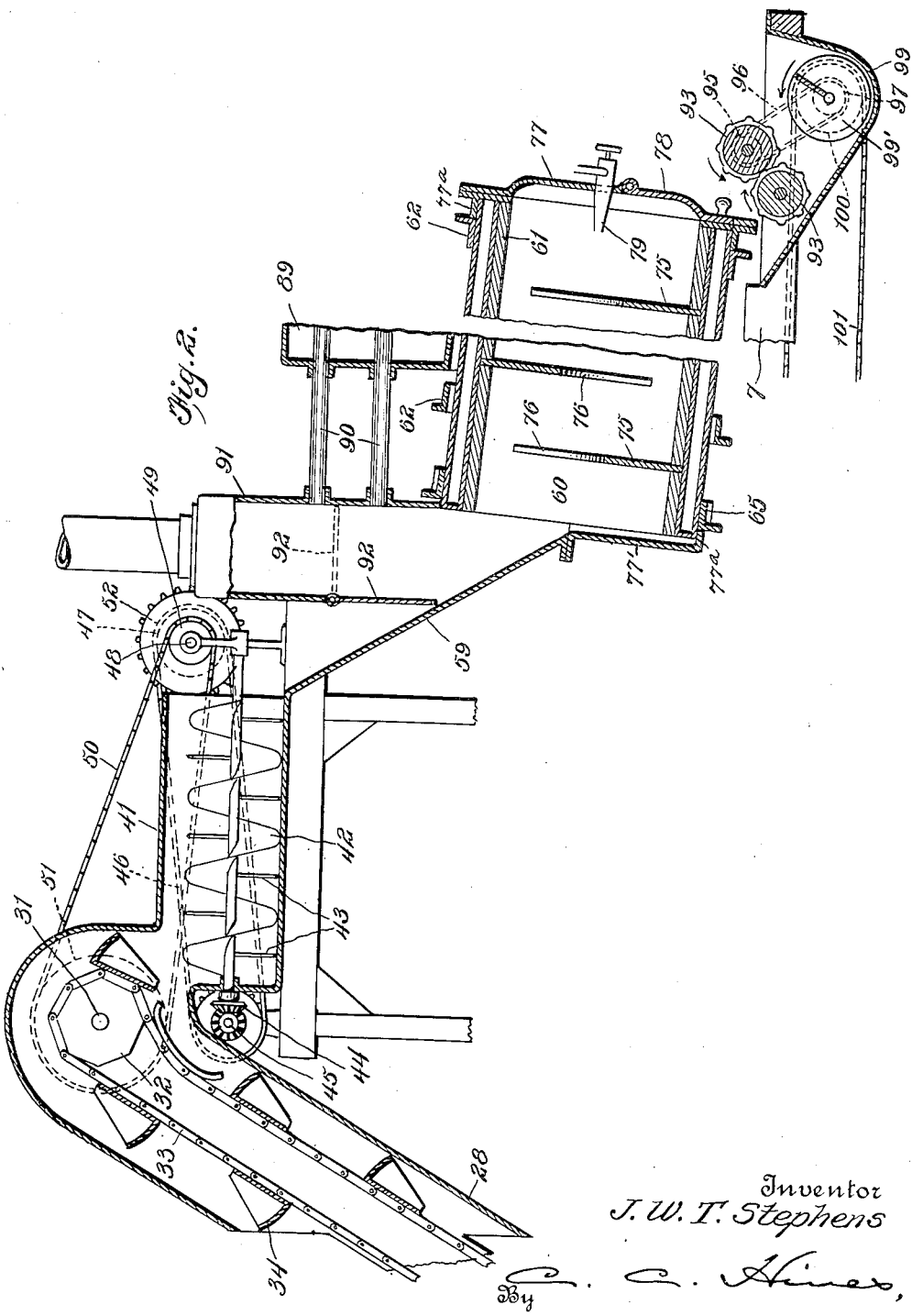

J. W. T. STEPHENS.
ROAD MAKING MACHINE.
APPLICATION FILED APR. 21, 1919.
1,354,076.
Patented Sept. 28, 1920.
4 SHEETS—SHEET 3.
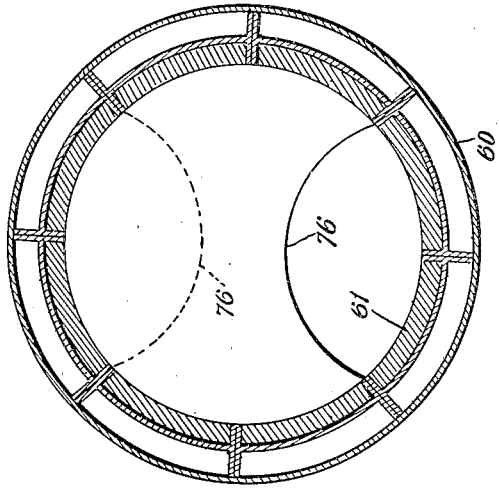
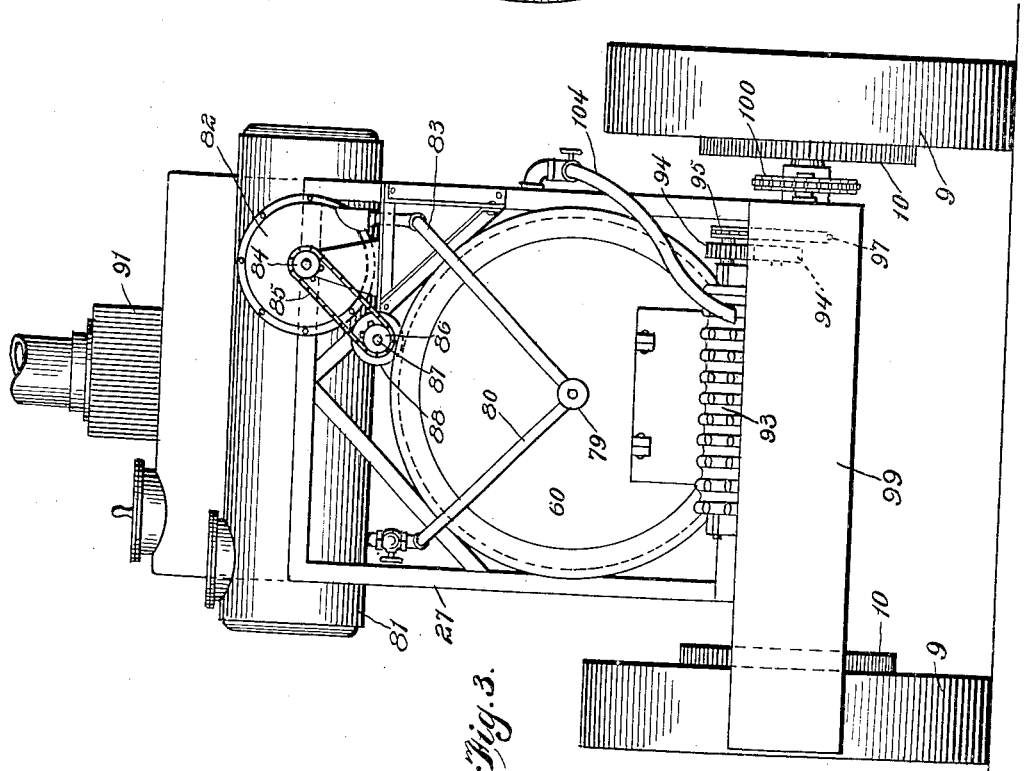
Inventor
J. W. T. Stephens
By C. C. Hines,
Attorney

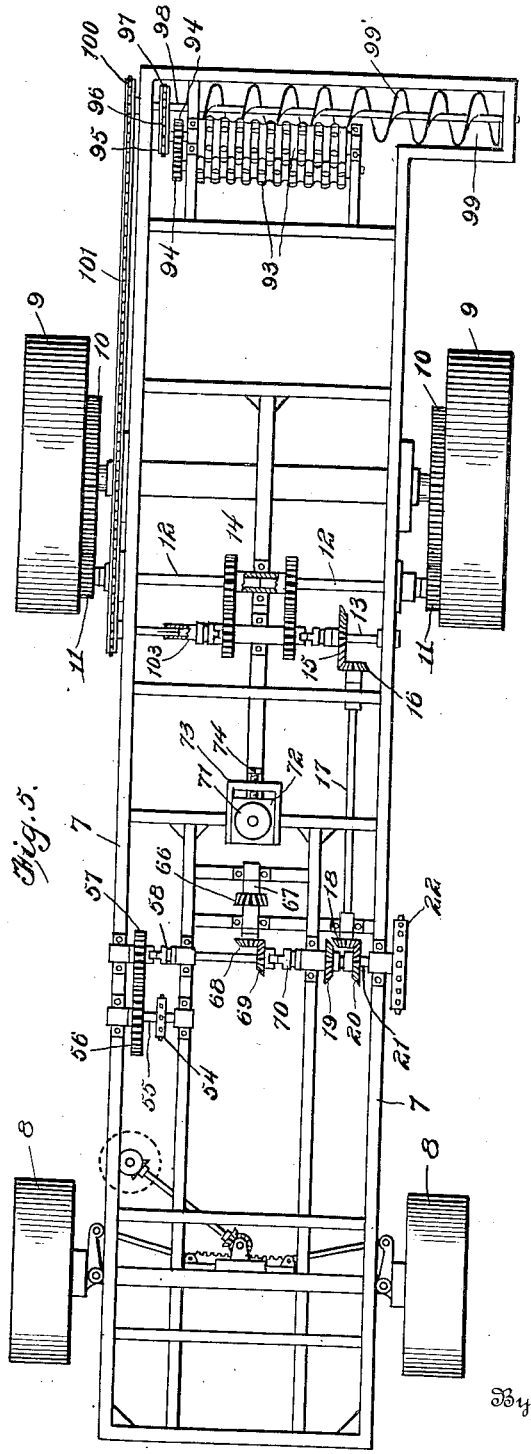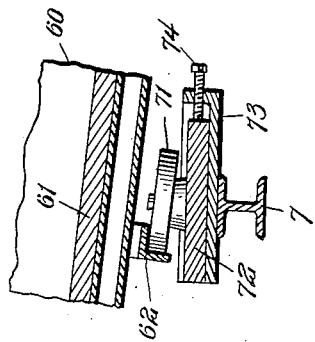

UNITED STATES PATENT OFFICE.

JAMES W. T. STEPHENS, OF NEW ORLEANS, LOUISIANA, ASSIGNOR OF ONE-THIRD TO HARLEY A. W. HOWCOTT AND ONE-THIRD TO J. P. BALDWIN, BOTH OF NEW ORLEANS, LOUISIANA.

ROAD-MAKING MACHINE.

1,354,076.

Specification of Letters Patent.

Patented Sept. 28, 1920.

Application filed April 21, 1919. Serial No. 291,436.

*To all whom it may concern:*

Be it known that I, JAMES W. T. STEPHENS, a citizen of the United States, residing at New Orleans, in the parish of Orleans and State of Louisiana, have invented new and useful Improvements in Road-Making Machines, of which the following is a specification.

This invention relates to road making machines, having for its primary object to provide a machine of improved construction capable of taking a portion of the material to be employed from the road bed itself, crushing and calcining the same and delivering the material to a mixer, wherein the crushed and calcined materials will be thoroughly mixed with other substances, such as tar or a like binder, and delivered to the prepared road sub-surface.

A machine of this character is particularly useful in road making in localities where the earth contains quantities of humus or where the ground contains much moisture, and also where the ground is rich in limes and silicates or other materials which by calcination are converted into cementitious materials.

A further object of the invention is to provide a machine capable of performing a process of removing the top surface of the ground, crushing and breaking the removed material, subjecting the material to heat to dry and calcine the same, mixing the dried and calcined material with a binder, and replacing such materials so mixed upon the ground.

A further object is to provide a machine for performing these functions which is mounted upon a vehicle so as to enable the same to be readily transported under its own power; which has its various operating mechanisms driven from the source of motive power; which is equipped with a series of clutch mechanisms capable of accurately controlling the movement of the vehicle and the various operating mechanisms thereon; and which will prove thoroughly practical and efficient in use.

With these and other objects in view, the invention consists of the features of construction, combination and arrangement of parts hereinafter fully described and claimed, reference being had to the accompanying drawings, in which:—

Figure 1 is a side elevation of a road making machine constructed in accordance with the invention, Fig. 2 is a detail sectional view, parts broken away, taken longitudinally through the mechanisms for operating upon the material collected from the roadway, Fig. 3 is a rear elevation of the improved machine, Fig. 4 is a sectional view taken transversely through the mixing drum, Fig. 5 is a plan view of the chassis of the road making machine and illustrating the clutch and gear connections, and Fig. 6 is a detail sectional view illustrating the improved means whereby longitudinal adjustment of the mixing drum may be made.

The frame or chassis of the vehicle is indicated generally at 7, and is supported at its front end by the guide wheels 8 and at its rear end with the drive wheels 9. Steering mechanism of any preferred type may be connected with the steering wheels 8 for operating the latter, a conventional form of steering apparatus being illustrated in Fig. 5. The drive wheels have connected therewith gears 10, which are in mesh with pinions 11 secured to the ends of jack shafts 12 rotatably mounted upon the chassis, and these jack shafts are connected with the drive shaft 13 by means of the differential mechanism indicated generally at 14. The drive shaft carries a bevel gear 15 in mesh with a similar gear 16 on the longitudinally disposed shaft 17; the forward end of the shaft 17 being provided with a bevel gear 18 adapted to be engaged by either of bevel gears 19 and 20 carried by shaft 21. The shaft 21 is provided at one end with a sprocket 22, over which passes a chain or belt 23, the forward loop of which passes over sprocket 24 secured to the engine shaft 25. The engine, indicated generally at 26, may be of the internal combustion type.

From this description it is obvious that rotary movement may be applied to the drive wheels 9 in either direction, such movement depending upon which of the bevel pinions 19—20 is engaged with the bevel gear 18 at the forward end of shaft 17. When it is desired to halt the progress of the vehicle, the gears 19 and 20 may be so moved that neither is engaged with gear 18, whereupon rotary movement in shaft 21 will not be transmitted to the drive gears. The differential mechanism indicated at 14 permits of the vehicle being steered, as will be understood.

The vehicle has arranged thereon a superstructure indicated at 27, from the forward end of which extends the downwardly inclined conveyer frame 28, the lower end of the said frame being equipped with a shoe 29 adapted to either engage or lie in close proximity to the road surface. The lower end of the conveyer frame is connected to the vehicle frame or chassis by the means of the link 30. The conveyer frame has extending transversely therethrough at its upper end a shaft 31, equipped with sprockets 32 of conventional form, over which bucket chain 33 passes. This chain is provided with buckets 34 as shown. It will be understood that shaft 31 has a sprocket 32 near each end thereof, and each sprocket is equipped with a chain, the buckets connecting the said chains. The lower end of the conveyer frame is similarly equipped with the transverse shaft 35, and upon which may be mounted suitable sprockets to receive the lower loops of conveyer chains 33. The shaft 35 is mounted in a slidable bracket controlled by the rotatable member 36, whereby the shaft may be moved longitudinally of the conveyer frame when desired. This particular construction enables the chains to be properly tensioned. The shoe has projecting forwardly therefrom arms 37, the forward ends of which are connected by the shaft 38. This shaft has secured thereto a sprocket wheel over which passes a chain 39, the rear loop of the chain passing over a sprocket affixed to one end of the shaft 35. The shaft 38 is provided with radial arms constituting digger members 40, which engage with the ground and loosen the same before it is engaged and received in the shoe. This particular sprocket and chain connection causes the digger elements to operate simultaneously with the conveyer.

The conveyer frame communicates at its upper end with a casing or housing 41, in which the worm 42 operates. This worm is provided with a series of spikes 43 to agitate and break the material delivered from the conveyer buckets to the housing during its passage rearwardly thereof. The conveyer is operated by means of the bevel gear connection 44 upon the shaft of the worm conveyer and the shaft 45 mounted in suitable brackets upon the superstructure 27. The shaft 45 derives its rotary movement through sprocket chain 46 passing over a sprocket upon the said shaft and also over sprocket 47 on shaft 48 at the rear of the housing 41. The shaft 48 is provided with a sprocket 49, over which passes a chain 50 looped at its forward end over sprocket 51 at one end of the conveyer chain supporting shaft 31. The shaft 48 is further provided with a sprocket 52, having passed thereover a chain 53, the lower end of which travels over a sprocket 54 secured to a stub shaft 55 mounted upon the chassis. This stub shaft 55 carries a gear 56 in mesh with a similar gear 57 to be driven by shaft 21, a clutch 58 being provided in this shaft to make or sever the driving connection between the same and the said gear 57.

The rear end of the worm conveyer 42 communicates with the upper end of a throat 59, the lower end of which communicates with the forward end of a mixing drum or cylinder 60. This drum is disposed longitudinally of the vehicle and near the rear end thereof, being inclined upwardly from its rear to its forward ends. The cylinder may be made of sheet metal and is preferably double walled to provide a dead-air space, as shown, and if preferred the interior of the inner portion of the cylinder may be lined with brick 61. The outer surface of the cylinder is provided with annular trackways 62, which rest upon rollers 63 mounted in brackets 64 at the sides of the chassis, whereby the said cylinder is capable of being rotated. The cylinder is also provided with a gear rim 65, which is in mesh with a pinion 66 carried by a stub shaft 67 on the vehicle frame. This stub shaft is equipped with a bevel gear 68 in mesh with a similar gear 69 carried by the shaft 21, and a clutch 70 is provided in this shaft to enable the driving connection between stub shaft 67 and shaft 21 to be made or severed. It will be understood that when the clutch is moved to its limit in one direction, the motion of shaft 21 will be transmitted to bevel pinion 66, whereupon the mixing cylinder or drum 60 will be caused to rotate. The cylinder or drum is held properly alined with the pinion 66 and supporting rollers 63 by means of the adjusting rollers 71. This roller is rotatably mounted upon the block 72 adjustably mounted in the frame 73 supported by the chassis, and the screw 74 is provided for the purpose of making adjustments of the movable block. The roller 71 may thus be moved into or out of contact with the outwardly projecting flange constituting a part of trackway 62 near the forward or upper end of the mixing cylinder.

The cylinder 60 is provided upon the interior thereof with a series of baffles indicated at 75. These baffles are of substantially circular shape and fit snugly within the cylinder in spaced relation to each other, each of the baffles being provided with an arcuate gap or opening 76, and the said gaps upon the adjacent baffle plates are disposed at diametrically opposite points to each other, so that material delivered to the mixing drum will be caused to take a tortuous path in traveling from the front to the rear of the drum. By constructing the baffles and arranging them in the manner set forth, the materials delivered to the drum will be thoroughly agitated and mixed and held within the drum a comparatively long time. The lower or rear end of the drum is closed by a head or wall 77, having a door 78 arranged therein, and it will be understood that the contents of the drum may be caused to pass therefrom by opening of this door. The upper or front end of the drum is partly closed by a wall or head 77'. The walls or heads 77 and 77' have flanges 77ª lapping the ends of the cylinder and within which the cylinder rotates.

The rear wall of the mixing drum is equipped with a flame nozzle or jet indicated at 79, so that a relatively high degree of heat may be maintained within the drum. This nozzle receives a combustible fluid through the pipe 80 leading from tank 81 supported by superstructure 27, and a rotary fan 82 of suitable construction may also be provided for forcing air through pipe 83 to the said nozzle. This mixture of air and gas passing from nozzle 79 will be highly inflammable. The rotary fan may be provided with a shaft 84, over which passes sprocket chain 85, the latter being looped over sprocket 86 secured to stub shaft 87 having a roller 88 thereon in contact with the periphery of drum 60 or one of the trackways thereof.

The mixing cylinder is straddled by a tank 89 adapted to contain a binder such as tar, tarvia or the like to be mixed with the mass delivered from the mixing chamber. This binder may be maintained in proper fluent condition by the heating coil 90 which passes through the upper part thereof. This coil is connected at its ends with the stack 91 mounted above and in communication with the throat 59; the said stack being provided for the purpose of carrying off the products of combustion from the mixing cylinder 60. The forward part of stack 90 has arranged thereon a horizontal swinging door, or gate 92, establishing direct communication between the mixing cylinder and the stack when in vertical position, but causing the products of combustion to be diverted and passed through the heating coil 90 when swung to horizontal position, as shown in dotted lines in Fig. 2.

The mixing drum 60 is arranged so as to discharge its contents between crushing rolls 93, the latter being geared together as at 94 in Fig. 5, and the supporting shaft of one of the rolls is provided with a sprocket 95 having a chain 96 passing thereover and also over a sprocket 97 carried by worm conveyer shaft 98 disposed transversely of the vehicle in a trough 99 at the rear end of the same. The worm shaft is equipped with a sprocket 100, over which chain 101 passes, and the forward end of this chain is engaged with sprocket 102 secured to the drive shaft 13. A clutch 103 may be arranged in the shaft 13 so that a driving connection between the motive source and sprocket chain 101 may be made or severed as desired.

The mechanisms for operating upon the material gathered by the machine may be caused to operate either while the vehicle is in travel or standing still, the clutch mechanisms shown being provided for this purpose. As the vehicle advances, the ground is broken and scooped at the forward end of the machine, and the buckets 34 of the chain conveyer cause the material to be elevated and deposited in the worm conveyer housing 41. The worm conveyer causes the material to be fed slowly to the throat 59, and during such travel material is operated upon so as to be disintegrated by the radial spikes 43. The material thus thoroughly broken passes through the throat 59 into the drum or cylinder 60. The rotary movement of this cylinder causes the material to be tumbled and further broken and conveyed slowly from the forward to the rear end of the cylinder. During such travel, the mass becomes heated to the proper degree, and is then delivered in such heated state to the crushing rolls 93. The crushing rolls have their surfaces provided with interfitting annular ribs, the peripheries of which are toothed as shown so as to thoroughly crush materials passing between the same. At this stage of the operation the binder, such as tar, tarvia or like substances, is mixed with the material, being led to the trough 99 through holes or pipes 104. The laterally disposed conveyer 99' in the trough 99 causes the mass to be thoroughly mixed during its travel to the discharge opening at one end of the said trough. The mass in this condition is deposited upon the ground, whereupon it may be applied to the road surface in any desired manner.

Having thus fully described my invention, I claim:—

1. In a road making machine, a rotary calcining cylinder, a throat communicating with said cylinder, means for delivering comminuted earth to the throat for passage to the cylinder, means for heating the interior of the cylinder, a stack communicating with the throat for the discharge of the products of combustion from the cylinder, a binder receptacle, a heating coil within said receptacle and having its inlet and discharge ends communicating with the stack, and means in the throat for causing the products of combustion from the cylinder to pass directly outward through the stack or to pass through said coil before discharging through the stack.

2. In a road making machine, a wheeled frame, a primary receptacle on the frame for receiving earthy material, means for gathering and conveying the earthy material to said receptacle, a material feeding and disintegrating conveyer in said receptacle, a rotary material sub-dividing and calcining drum arranged in a forwardly and upwardly inclined position, an inclined throat connecting the upper forward portion of said drum with the rear of said primary receptacle, means arranged at the rear of the drum for heating the interior thereof, a receptacle for a plastic binder disposed upon the drum, a heating coil in said receptacle having inlet and discharge ends communicating with the throat, a stack communicating with the throat, and a gate in said stack adjustable to positions to cause the products of combustion to pass out directly through the stack or first through the coil before discharging through the stack.

3. In a road making machine, a wheeled frame, a primary receptacle on the frame for receiving earthy material, means for gathering and conveying the material to said receptacle, a rotary material sub-dividing and calcining drum in communication with said receptacle, a material conveying and disintegrating conveyer in the receptacle, means for heating the drum, crushing rolls arranged at the rear of the drum for crushing the material discharged therefrom, and means for receiving the crushed material from the rolls and mixing the same with a plastic binder.

4. In a road making machine, a wheeled frame, a primary receptacle upon the frame for receiving earthy material, means for gathering and conveying the material to said receptacle, a material disintegrating and feeding conveyer in said receptacle, a rotary material sub-dividing and calcining drum communicating at its upper forward portion through an inclined throat with the discharge outlet of said receptacle, means arranged at the rear end of the drum for heating the interior thereof, a receptacle for a plastic material arranged to straddle the upper portion of the drum, a stack communicating with the inclined throat, a heating coil arranged within said receptacle and having its inlet and discharge ends arranged at different elevations and communicating with the throat, a normally pendent hinged gate arranged within the throat for establishing communication between the drum and stack, said gate being adjustable across the throat to a position between the inlet and discharge ends of the coil to cause the products of combustion to pass through the coil before discharge through the stack, and means for mixing the disintegrated and calcined material from the drum with the plastic binder.

5. In a road making machine, a wheeled frame, a primary conveyer on the frame for receiving earthy material, means for gathering and elevating the material to said receptacle, a disintegrating conveyer in said receptacle, a rotary material sub-dividing and calcining drum mounted to rotate upon an axis inclined at an upward and forward angle and communicating at its upper forward portion with said receptacle, means arranged at the rear end of said drum for heating the same, a receptacle for a plastic binder, means for utilizing the heat from the drum to heat the contents of said receptacle, a discharge outlet for the material at the rear of the drum, a receptacle to receive the material discharged from the drum, crushing rolls in said receptacle for crushing the material passing thereinto, and means in said receptacle for mixing the material with a plastic binder.

6. A road making machine comprising a frame mounted on wheels, a cylinder rotatably mounted on said frame, a throat communicating with said cylinder, a stack communicating with the throat, a burner in said cylinder, a tank adapted to contain liquid binder, a heating coil in said tank and communicating with said stack, and a baffle plate in said stack to direct the products of combustion from said throat through said coil.

7. In a road making machine, a rotary material sub-dividing and calcining drum, means for introducing previously partly comminuted earthy material into the forward end of the drum, said drum being provided at its rear end with an outlet, means at the rear end of the drum for heating the interior thereof to calcine the material, crushing rolls below the outlet of the drum, a gate for closing said outlet, and means for receiving the material from the rolls and mixing the same with a plastic binder.

8. In a road making machine, a vehicle, a conveyer frame at the forward end of said vehicle, a digger member for breaking material and delivering the same to said frame, a conveyer in said frame, a worm conveyer on said vehicle to receive material from said first mentioned conveyer, disintegrating spikes carried by said worm conveyer, material agitating and comminuting means carried by said worm conveyer, a downwardly inclined throat communicating with said worm conveyer, a rotating drum to receive material from said throat, crushing rolls in the rear of said drum to receive material delivered therefrom, a binder nozzle to direct liquid upon the material passing through said rolls, and means for heating the interior of the drum.

9. In a road making machine, a frame, a drum rotatably mounted upon said frame, crushing rolls in the rear of said drum to receive material therefrom, a conveyer in the rear of said rolls, a binder tank straddling and closely fitting upon said drum, means for heating said drum, and a nozzle to deliver fluid from said tank to the material as it leaves said rolls.

10. In a road making machine, a worm conveyer upon said machine, spikes carried by said conveyer for disintegrating material delivered thereto, a rotatable cylinder below said conveyer, a throat establishing communication between said conveyer and said cylinder, means extending into the rear of the cylinder for heating said cylinder, a mixing chamber, means for introducing a binder to said mixing chamber, and means for further disintegrating the material simultaneously with the mixing of the binder with the same.

11. In a road making machine, a rotary sub-dividing and calcining drum having an outlet at its rear end, means for introducing a previously partly disintegrated earthy material into said drum, means at the rear end of the drum for heating the interior thereof to calcine the material, a receptacle for holding a plastic binder, means for utilizing the heat from the drum for heating the contents of said receptacle, a receptacle to receive the material discharging from the outlet of the drum, a gate for closing said outlet, crushing rolls for acting upon the material discharged into the last-named receptacle, means for conducting the liquefied plastic material from its receptacle to the said last-named receptacle, and means arranged in said last-named receptacle for mixing the earthy material with the binder.

12. In a road making machine, a vehicle, a cylinder rotatably mounted upon said vehicle, said cylinder having a dead air space at the periphery thereof, a lining for said cylinder, baffle plates in spaced relation within said cylinder and arranged transversely thereof, the said plates conforming to the shape of the said cylinder, and each of said plates having a gap therein disposed at a point diametrically opposite from the gaps in the next adjacent plates.

13. In a road making machine, a wheeled supporting frame, spaced heads upon the frame, a rotary material comminuting and calcining cylinder arranged between said heads, the forward head being arranged to close the lower portion of the front end of the cylinder and the rear head being arranged to close the rear end of the cylinder and provided with a discharge outlet, a gate for closing said outlet, heating means supported by the rear head, means for introducing a disintegrated earthy material into the cylinder through the upper forward portion thereof, a gear ring upon the cylinder, a drive gear upon the frame meshing with said gear ring, means for adjusting the cylinder to maintain engagement between the gear and gear ring, and means for receiving the material discharging from the cylinder and mixing the same with a binder.

14. In a road making machine, a vehicle, a cylinder rotatably mounted upon the vehicle, and baffle plates in spaced relation within said cylinder and arranged transversely thereof, the said plates conforming to the shape of the said cylinder, and each of said plates having a gap therein disposed at a point diametrically opposite from the gaps in the next adjacent plates.

In testimony whereof I affix my signature.

JAMES W. T. STEPHENS.